United States Patent
Raichle et al.

(10) Patent No.: US 8,779,703 B2
(45) Date of Patent: Jul. 15, 2014

(54) METHOD FOR OPERATING A POLYPHASE MACHINE HAVING A PULSE-WIDTH-MODULATED INVERTER

(75) Inventors: Daniel Raichle, Eberdingen-Nussdorf (DE); Gunther Goetting, Stuttgart (DE); Martin Eisenhardt, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 13/202,938

(22) PCT Filed: Jan. 8, 2010

(86) PCT No.: PCT/EP2010/050136
§ 371 (c)(1),
(2), (4) Date: Nov. 3, 2011

(87) PCT Pub. No.: WO2010/097246
PCT Pub. Date: Sep. 2, 2010

(65) Prior Publication Data
US 2012/0038295 A1 Feb. 16, 2012

(30) Foreign Application Priority Data
Feb. 25, 2009 (DE) .......................... 10 2009 001 125

(51) Int. Cl.
*H02P 21/00* (2006.01)
(52) U.S. Cl.
USPC ...................... 318/400.02; 318/609; 318/803
(58) Field of Classification Search
USPC ............ 318/400.02, 609, 803, 800, 811, 610, 318/560, 801
See application file for complete search history.

(56) References Cited

U.S. PATENT DOCUMENTS

| 5,944,867 A * | 8/1999 | Chesnoy et al. | ................ | 65/408 |
| 2003/0222612 A1 | 12/2003 | Matsushita | | |

FOREIGN PATENT DOCUMENTS

| CN | 1189440 | 8/1998 |
| CN | 101110559 | 1/2008 |
| CN | 101330269 | 12/2008 |
| DE | 10219826 | 11/2003 |
| EP | 1886900 | 2/2008 |
| EP | 2015445 | 1/2009 |
| JP | 2003-348900 | 12/2003 |
| JP | 2007-135345 | 5/2007 |
| JP | 2008-11628 | 1/2008 |

* cited by examiner

*Primary Examiner* — Karen Masih
(74) *Attorney, Agent, or Firm* — Kenyon & Kenyon LLP

(57) ABSTRACT

A method for operating a polyphase machine having a pulse-width-modulated inverter includes: determining a setpoint current value respectively for a current in the longitudinal direction and/or the transverse direction based on a specified torque, ascertaining a setpoint voltage value respectively for a voltage in the longitudinal direction and/or the transverse direction with the aid of the setpoint current value and/or of an actual current value determined at the pulse-width-modulated inverter, controlling and/or regulating the polyphase machine corresponding to the ascertained setpoint voltage value. In this context it is provided that, in addition, using a model, a model value is determined respectively for the voltage in the longitudinal direction and/or the transverse direction, the difference between the setpoint voltage value and the model value is ascertained, and in response to the exceeding of a specifiable maximum difference, an error signal is triggered.

6 Claims, 2 Drawing Sheets

---
METHOD FOR OPERATING A POLYPHASE MACHINE HAVING A PULSE-WIDTH-MODULATED INVERTER

FIELD OF THE INVENTION

The present invention relates to a method for operating a polyphase machine having a pulse-width-modulated inverter, having the steps: Determining a setpoint current value for a current in the longitudinal direction and/or the transverse direction, respectively, based on a specified torque, ascertaining a setpoint voltage value for a voltage in the longitudinal direction and/or the transverse direction, respectively, with the aid of the setpoint current value and/or of an actual current value determined at the pulse-width-modulated inverter, controlling and/or regulating the polyphase machine corresponding to the setpoint voltage value ascertained. The present invention also relates to a polyphase machine.

BACKGROUND INFORMATION

German Patent No. DE 102 19 826 A1, for example, describes a method and a device for the field-oriented regulation of a synchronous machine. In this instance, the output variables of a direct-axis current regulator and of a cross current regulator are converted in a stationary decoupling network to a direct-axis component of voltage and a cross voltage component, and these are subsequently submitted to a limitation as a function of the rotational speed of the synchronous machine. The limited direct-axis components of voltage and the cross voltage components are transformed in a transformer into voltages of a polyphase three-phase current system. These voltages are passed on to a pulse-width-modulated inverter and converted by the latter to a control voltage for the synchronous machine. The polyphase machines mentioned are used, for instance, in electrical drives, especially for hybrid and electric vehicles. For the operation of the polyphase machine, pulse-width-modulated inverters are used. The electrical drives named have a series of diagnostic functions. With the use of these, one is usually able to determine complete failure of elements in the polyphase machine, particularly in the pulse-width-modulated inverter. These diagnostic functions, up to now, have been implemented in a comparatively effortful, and thus cost-laden manner.

SUMMARY

According to the present invention, it is possible to detect errors in a power section of the pulse-width-modulated inverter and/or the polyphase machine, the method being able to be implemented at low costs. The example method particularly makes possible detecting loose phase connections at the pulse-width-modulated inverter. According to the present invention, this is achieved by additionally, using a model, determining a modeled value for the voltage in the longitudinal direction and/or the transverse direction, ascertaining the difference between the setpoint voltage value and the model value, and triggering an error signal in response to the exceeding of a specifiable maximum difference. The example embodiment of the present invention uses a model of the polyphase machine that is calculated in parallel to the current controller of the polyphase machine. From this, modeled values result, i.e. voltages in the longitudinal and/or transverse direction. If these have too great a difference from the setpoint voltage values in the longitudinal direction and/or the transverse direction, that is, if the maximum difference is exceeded, the error signal is triggered. After the occurrence of the error signal, suitable measures may be initiated for reaction to the defect of the polyphase machine. The model, in this context, is adjusted to the polyphase machine, or rather its pulse-width-modulated inverter in such a way that, in a normal operation of the polyphase machine, the difference between the setpoint voltage value and the model value is small. Current and voltage in the longitudinal direction, in this instance, designate the variables forming the field, while the current and the voltage in the transverse direction show variables forming torque. As the input values for the model, the setpoint current value and/or the actual current value determined at the pulse-width-modulated inverter are used, for example. As the output value, the model yields the model value, while the setpoint voltage value for the polyphase machine may be determined in the manner described. If the difference between the setpoint voltage value and the model value becomes too great, and exceeds the specifiable maximum difference in this context, this is an indication that the specifiable torque cannot be set because of an error in the polyphase machine or the pulse-width-modulated inverter. In this context, loose phase connections at the pulse-width-modulated inverter are also detected, because, based on the transition resistance, that is high then, the stator resistance of the model differs seriously from the real stator resistance.

One refinement of the present invention provides that the model have the setpoint current value and/or the actual current value and/or a rotational speed of the polyphase machine as the input variable. To determine the model value for the voltage in the longitudinal direction and/or the transverse direction, respectively, the model is able to fall back on at least one of the variables setpoint current value, actual current value and rotational speed of the polyphase machine. On this basis, the model is able to determine the modeled value at sufficient accuracy, so that in normal operation, in the polyphase machine no difference is present, or only a slight difference between the setpoint voltage value and the modeled value.

One further refinement of the present invention provides that the setpoint voltage value is ascertained using a controller, in particular a controller having an integral action component. The setpoint voltage values, which are also designated as voltage controlled variables, in the longitudinal direction and the transverse direction, are ascertained with the aid of a controller. A controller is advantageously used, in this context, which has at least one integral action component. The integral action component is represented by an integral element. The integral element is a transmission element whose output, at constant input, shifts to a ramp function for long periods of time. This means that the output of the integral element is formed essentially by integration of the input variable, and only approaches a constant value when the input variable is equal to zero.

One refinement of the present invention provides that the model is set to the pulse-width-modulated inverter and/or a motor of the polyphase machine. In order to adjust the model to the polyphase machine or the pulse-width-modulated inverter, an adjustment process is carried out. Known control parameters may be transferred into the model, for example, or a calibration of the model may be carried out. In the case of the latter procedure, the complete system of polyphase machine, pulse-width-modulated inverter and model is operated, and during the operation, the model is adjusted so that it is able to reflect the properties of the polyphase machine and the pulse-width-modulated inverter at sufficient accuracy. Alternatively, however, as was described before, known values may also be transferred into the model. These values may already have been determined before an operation of the polyphase machine.

One further development of the present invention provides that the polyphase machine is stopped in response to the triggering of the error signal. In order to prevent damage to the polyphase machine and the pulse-width-modulated inverter, the polyphase machine is stopped as soon as the error signal is triggered. For this purpose, the setpoint voltage value is set to a value at which the polyphase machine is able to be stopped in a controlling and/or regulating manner.

The present invention also relates to a polyphase machine, particularly for carrying out the abovementioned method, using a pulse-width-modulated inverter and a control and/or regulating device for determining a setpoint current value respectively for a current in the longitudinal direction and/or the transverse direction, based on a specified torque, for ascertaining a setpoint voltage value for a voltage in the longitudinal direction and/or the transverse direction, respectively, and/or an actual current value determined at the pulse-width-modulated inverter, and for the control and/or regulation of the polyphase machine corresponding to the ascertained setpoint voltage value. It is provided, in this context, that the control and/or regulating device, in addition to the determination of a model value for the voltage in the longitudinal direction and/or the transverse direction, respectively, is provided for ascertaining the difference between the setpoint voltage value and the model value, and for triggering an error signal in response to the exceeding of a specifiable maximum difference. That is, using the control and/or the regulating device, the abovementioned method is able to be implemented in a simple manner. The control and/or regulating device is provided anyway at the polyphase machine, in order to determine the setpoint current value based on the specified torque, to ascertain the setpoint voltage value and to control and/or regulate the polyphase machine corresponding to the latter.

The present invention will be described in greater detail below with the aid of the exemplary embodiments shown in the figures, without a restriction of the present invention taking place.

DETAILED DESCRIPTION OF EXAMPLE EMBODIMENTS

Figure 1:
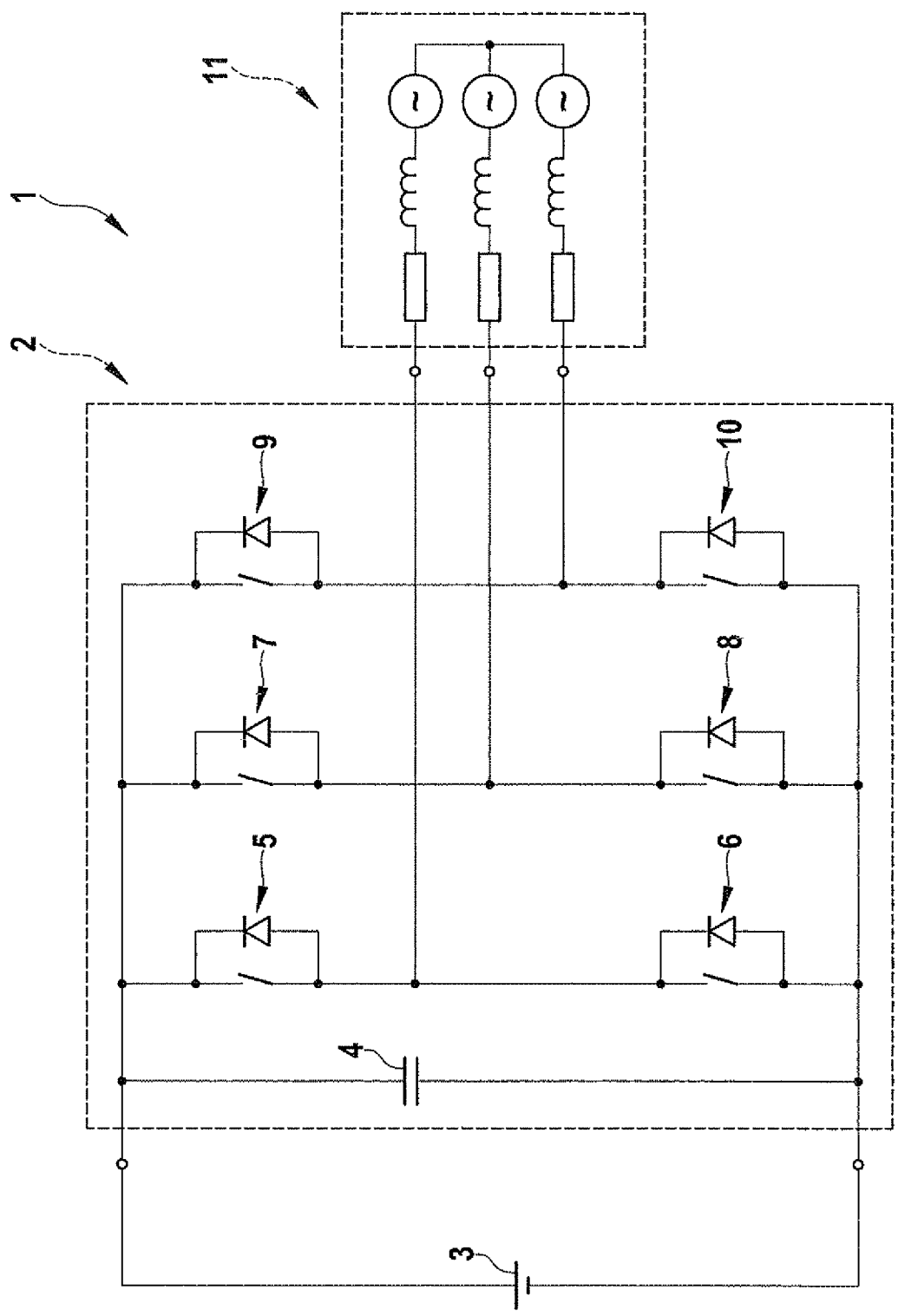
FIG. 1 shows a schematic representation of a polyphase machine having a pulse-width-modulated inverter.

FIG. 1 shows a schematic representation of a polyphase machine 1 having three drive trains connected to one another in star connection. Polyphase machine 1 has a pulse-width-modulated inverter 2. Polyphase machine 1 and pulse-width-modulated inverter 2 are connected to a power supply 3, whose voltage is able to be controlled or regulated using a control and/or regulating device. Furthermore, a capacitor 4 and pulse-width-modulated inverter elements 5, 6, 7, 8, 9 and 10 are provided in pulse-width-modulated inverter 2. Polyphase machine 1 has a working part 11, having the drive trains, which provides a torque via a shaft that is not shown.

Figure 2:
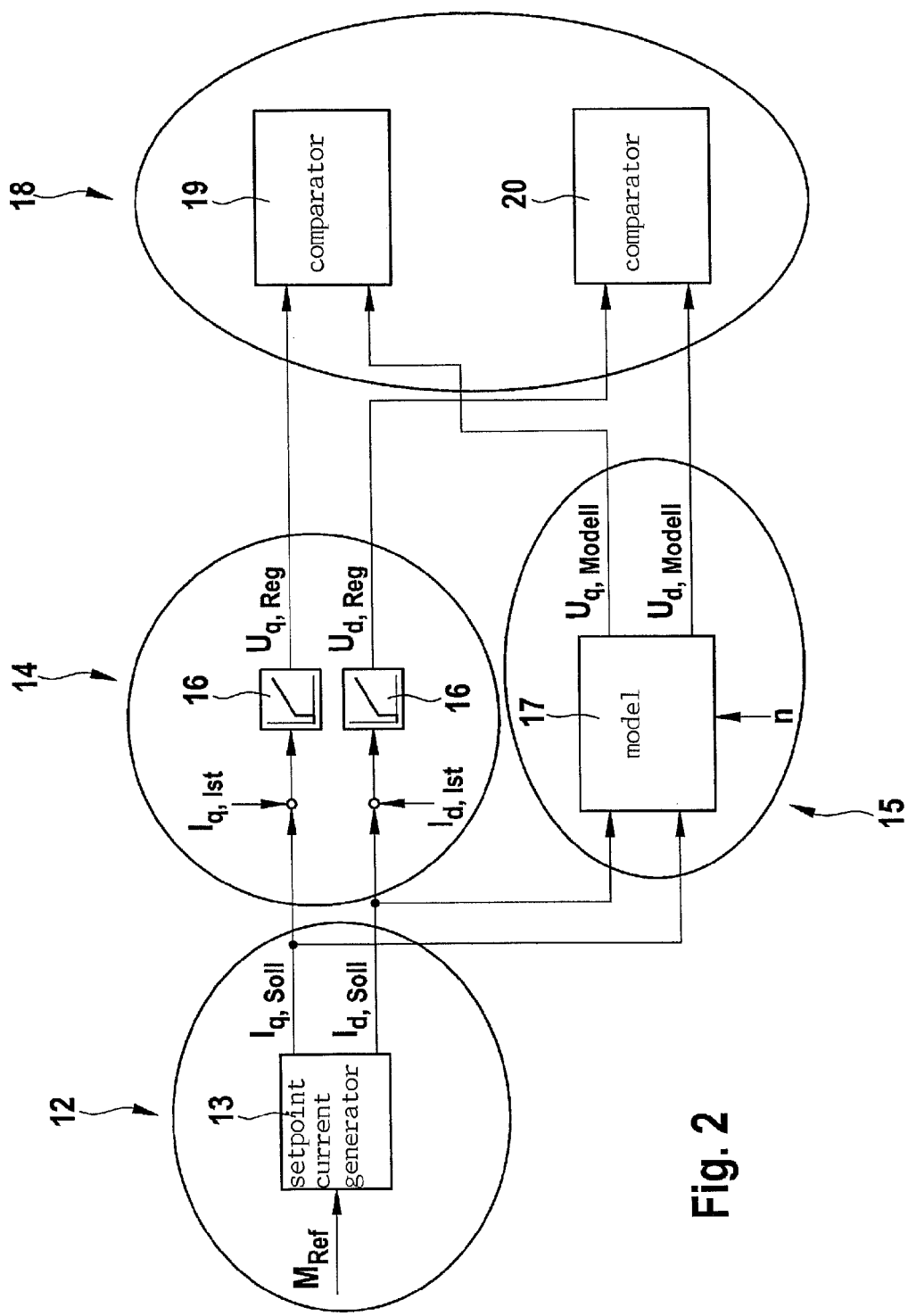
FIG. 2 shows a schematic representation of a method for operating the polyphase machine.

FIG. 2 shows a schematic flow chart for an example method for operating polyphase machine 1. The example method shown here is implemented using the control and/or regulating device of polyphase machine 1. In a section 12, a setpoint current value is determined respectively for a current in the longitudinal direction ($I_{q,\ setpoint}$) and the transverse direction ($I_{q,\ setpoint}$) based on a specified torque ($M_{Ref}$). This is shown in section 12 by box 13. The current setpoint value in the longitudinal direction and/or the transverse direction is now used as an input variable for sections 14 and 15. Section 14 also has as additional input variables a current actual value each in longitudinal direction ($I_{q,\ actual}$) and transverse direction ($I_{d,\ actual}$), while section 15 has rotational speed (n) as an additional input variable. The actual current value is determined at pulse-width-modulated inverter 2, the rotational speed originates with a rotational speed sensor (not shown) of polyphase machine 1. In section 14 a setpoint voltage value is ascertained respectively in longitudinal direction ($U_{q,\ reg}$) and transverse direction ($U_{d,\ reg}$) using two regulators 16, which each have an integral action component, from the setpoint current value and/or the actual current value. At the same time, in section 15, using a model (symbolized by box 17) a model value is determined from the setpoint current value and/or the actual current value, especially by using the rotational speed, and, in this case too, for a voltage in longitudinal direction ($U_{q,\ model}$) and transverse direction ($U_{d,\ model}$). Both the setpoint voltage value and the model value are present as input variables at a section 18. In this section, using a comparator 19, the voltage current value and the model value in the longitudinal direction are compared, while using a comparator 20, the setpoint voltage value and the model value for the transverse direction are compared. In this context, a difference is determined respectively for the longitudinal direction and the transverse direction.

If this difference exceeds a specifiable maximum difference, an error signal is triggered by the control and/or regulating device. When there is an error signal, polyphase machine 1 is able to be stopped by suitable control and/or regulating, in order to avoid further damage. If there is no error, thus if polyphase machine 1 is in a normal operation, the setpoint voltage value determined in section 14 is used for controlling and/or regulating polyphase machine 1. The model (box 17) is adjusted sufficiently accurately to polyphase machine 1, in the device described, so that in normal operation there is no difference, or only a small difference, between the model value and the setpoint current value. The polyphase machine described may be used, above all, for the electrical drive of a hybrid vehicle, but application to other electrical drives is also possible.

What is claimed is:

1. A method for operating a polyphase machine having a pulse-width-modulated inverter, comprising:
   determining a setpoint current value for a current in at least one of a longitudinal direction and a transverse direction based on a specified torque;
   ascertaining a setpoint voltage value for a voltage in at least one of the longitudinal direction and the transverse direction with the aid of at least one of the setpoint current value and an actual current value determined at the pulse-width-modulated inverter;
   controlling the polyphase machine corresponding to the ascertained setpoint voltage value;
   determining a model value for the voltage in at least one of the longitudinal direction and the transverse direction;
   determining a difference between the setpoint voltage value and the model value; and
   triggering an error signal in response to exceeding a specifiable maximum difference.

2. The method as recited in claim 1, wherein the model has at least one of the setpoint current value, the actual current value, and a rotational speed of the polyphase machine as an input variable.

3. The method as recited in claim 1, wherein the setpoint voltage value is ascertained using a regulator having an integral action component.

4. The method as recited in claim 1, wherein the model is adjusted to at least one of a pulse-width-modulated inverter and a motor of the polyphase machine.

5. The method as recited in claim 1, wherein the polyphase machine is stopped in response to the triggering of the error signal.

6. A polyphase machine comprising:
a pulse-width-modulated inverter and a control device for determining a setpoint current value for a current in at least one of a longitudinal direction and a transverse direction, based on a specified torque, for ascertaining a setpoint voltage value for a voltage in the longitudinal direction and the transverse direction with the aid of at least the setpoint current value and an actual current value determined at the pulse-width-modulated inverter and for controlling the polyphase machine corresponding to the ascertained setpoint voltage value;
wherein the control device determines a model value for a voltage in at least one of the longitudinal direction and the transverse direction using a model, ascertains a difference between the setpoint voltage value and the model value, and triggers an error signal in response to an exceeding of a specifiable maximum difference.

* * * * *